(12) United States Patent
Roberge

(10) Patent No.: US 9,241,440 B2
(45) Date of Patent: Jan. 26, 2016

(54) CONTROL SYSTEM FOR A DISC CUTTERBAR USING STUBBLE CUT QUALITY FEEDBACK

(71) Applicant: CNH Industrial Canada, LTD, Saskatoon (CA)

(72) Inventor: Martin J. Roberge, Saskatoon (CA)

(73) Assignee: CNH Industrial Canada LTD., Saskatchewan (CA)

( * ) Notice: Subject to any disclaimer, the term of this patent is extended or adjusted under 35 U.S.C. 154(b) by 270 days.

(21) Appl. No.: 13/782,718

(22) Filed: Mar. 1, 2013

(65) Prior Publication Data

US 2014/0245712 A1    Sep. 4, 2014

(51) Int. Cl.
 *A01D 41/14* (2006.01)
 *A01D 34/00* (2006.01)
 *A01D 34/66* (2006.01)

(52) U.S. Cl.
 CPC ............ *A01D 34/008* (2013.01); *A01D 34/664* (2013.01); *A01D 41/141* (2013.01); *Y10S 56/15* (2013.01)

(58) Field of Classification Search
 USPC ........ 56/6, 10.2 R, 10.2 C, 10.2 E, 17.1, 192, 56/208–210; 701/50; 460/6
 See application file for complete search history.

(56) References Cited

U.S. PATENT DOCUMENTS

| | | | |
|---|---|---|---|
| 1,799,714 A | 4/1931 | Wallace | |
| 3,070,938 A | 1/1963 | Winget | |
| 3,398,516 A * | 8/1968 | Quick | A01D 41/14 116/282 |
| 3,906,710 A * | 9/1975 | Pask | A01D 34/28 56/10.2 E |
| 4,126,989 A | 11/1978 | Oosterling et al. | |
| 4,158,945 A | 6/1979 | Burke | |
| 4,302,922 A | 12/1981 | Guerndt, Jr. et al. | |
| 4,455,815 A | 6/1984 | Grant | |
| 4,513,562 A * | 4/1985 | Strubbe | 56/10.2 G |
| 4,730,445 A | 3/1988 | Wolff | |
| 5,035,107 A | 7/1991 | Scarborough | |
| 5,694,751 A * | 12/1997 | Behnke | A01D 41/1278 56/10.2 F |
| 5,713,190 A * | 2/1998 | Vermeulen et al. | 56/10.2 E |
| 5,771,669 A | 6/1998 | Langworthy et al. | |
| 5,790,355 A * | 8/1998 | Ishmael | 361/27 |
| 5,794,421 A * | 8/1998 | Maichle | 56/10.2 E |
| 5,828,971 A * | 10/1998 | Diekhans | A01B 69/008 180/422 |
| 5,937,622 A | 8/1999 | Carrier et al. | |
| 5,996,323 A | 12/1999 | Campbell et al. | |
| 6,427,429 B1 | 8/2002 | Brabenec | |
| 6,484,481 B1 | 11/2002 | Langworthy et al. | |
| 6,668,528 B2 | 12/2003 | Franet et al. | |
| 7,275,355 B2 | 10/2007 | Adams et al. | |
| 7,350,344 B2 | 4/2008 | Heinz et al. | |
| 7,594,377 B1 | 9/2009 | Jansen et al. | |

(Continued)

*Primary Examiner* — Alicia Torres
(74) *Attorney, Agent, or Firm* — Patrick M. Sheldrake

(57) ABSTRACT

A control system for monitoring and managing operation of a rotary disc cutterbar used in an agricultural machine. A controller in the system receives inputs on cutterbar drive power, machine travel speed, and crop cut quality. An operator interface allows suitable operational tolerances to be established. The controller examines crop cut quality, a determination of cut uniformity across the transverse width of the cutting swath, and determines changes in cutterbar drive speed and/or vehicle travel speed, if needed, to maintain crop cut quality within specified tolerances. Controller output may be directed to a display for instructing a machine operator to make necessary adjustments or it may initiate changes in machine subsystems to effect the necessary adjustments automatically.

20 Claims, 4 Drawing Sheets

(56) References Cited

U.S. PATENT DOCUMENTS

| | | |
|---|---|---|
| 7,644,564 B2 | 1/2010 | Pellenc |
| 7,973,654 B2 | 7/2011 | Erhart et al. |
| 8,490,371 B2 | 7/2013 | Roberge |
| 2004/0148917 A1 | 8/2004 | Eastwood |
| 2006/0191250 A1 | 8/2006 | Neuerburg et al. |
| 2010/0005769 A1 | 1/2010 | Landry |
| 2013/0192188 A1* | 8/2013 | Talbot .................... A01D 34/13 56/257 |

\* cited by examiner

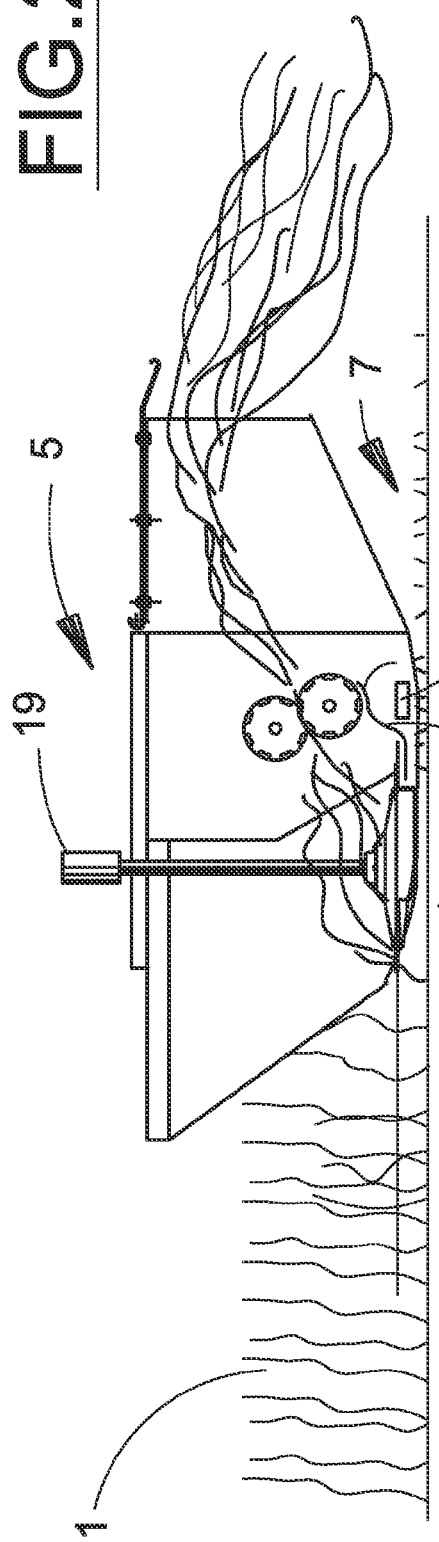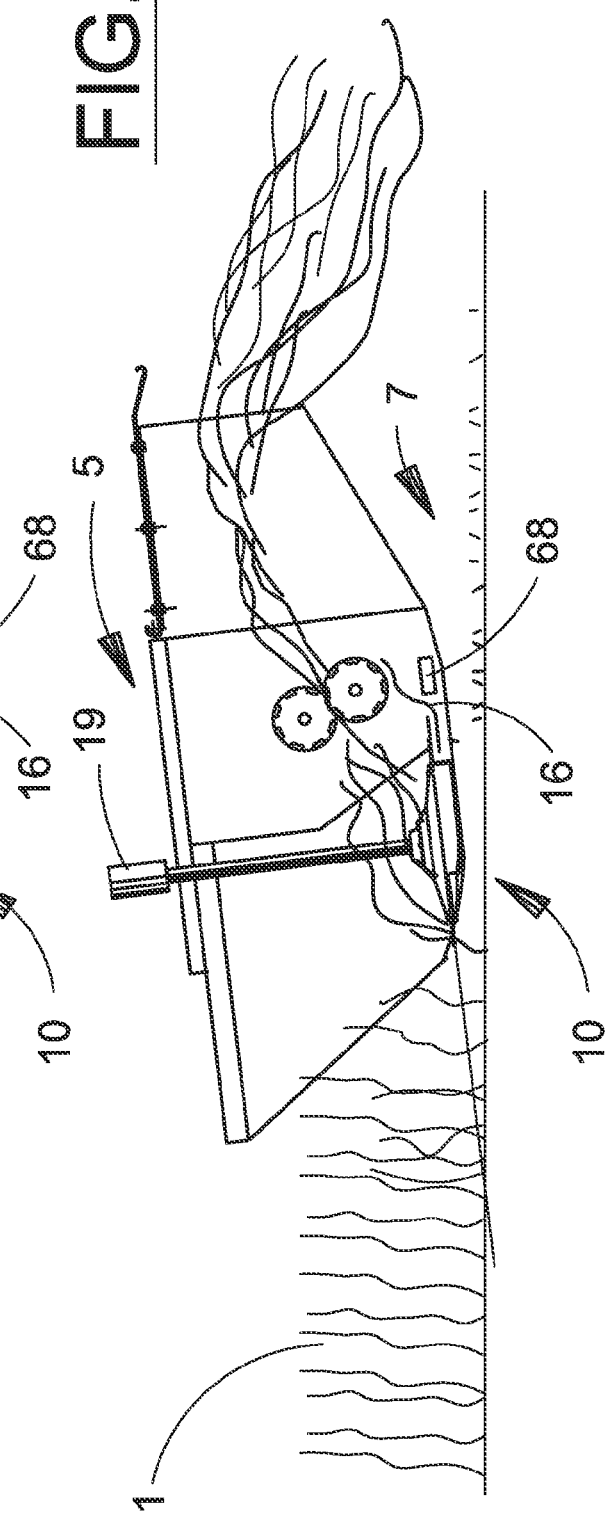

CONTROL SYSTEM FOR A DISC CUTTERBAR USING STUBBLE CUT QUALITY FEEDBACK

BACKGROUND OF THE INVENTION

This invention relates generally to a machine for severing standing crops from the ground to initiate a harvesting process and, more particularly, to a control system for monitoring the cutting quality of a rotary disc cutterbar and managing operational parameters for optimal cutterbar performance.

During crop cutting operations, a machine operator is tasked with observing the cut crop stubble to determine crop cut quality and altering cutterbar or machine parameters to achieve optimum cutting. The operator must also monitor cutterbar power and adjust machine and/or cutterbar parameters to prevent stalling the engine. These activities in addition to the primary task of piloting the machine through a field of standing crop may not always result in optimal crop cutting efficiency and can lead to operator fatigue.

Conventionally powered cutterbars typically include adjustments for rotational speed and cutting angle (a measure of the difference between the cutting plane and the ground). Machine travel speed may also be varied, typically as a means to manage the power necessary to operate the cutterbar. An electric motor driven rotary disc cutterbar is disclosed in Applicant's currently pending application Ser. No. 13/332, 213. Advantages of a cutterbar with individual electric motor driven cutterheads include the capability to easily adjust rotational speed and rotational direction of the modules on the cutterbar. In order to fully realize the advantages of individually controllable disc cutter modules, a means for monitoring crop cutting performance and providing performance feedback to the module control is necessary.

It would be advantageous to have a system for monitoring the cutting performance of an agricultural rotary cutterbar and providing feedback to the machine operator, the control system, or a combination thereof so that cutting performance and vehicle operational efficiency may be optimized while making the task of machine operation easier for the machine operator. Still further advantages would be realized by a control system that enables the machine operator to pre-select specific operating parameters or operating parameter ranges based on previous performance and subsequently optimizes cutterbar operation within specific pre-defined operational ranges. Additional advantages would be realized by a control system capable of monitoring available inputs and controlling adjustable cutterbar performance parameters affecting crop cut quality and machine efficiency.

SUMMARY OF THE INVENTION

Accordingly, the present invention, in any of the embodiments described herein, may provide one or more of the following advantages:

It is an object of the present invention to provide a control system for a rotary cutterbar on an agricultural machine that monitors cutterbar cutting performance and provides feedback to the machine operator.

It is a further object of the present invention to provide a control system for an agricultural cutterbar that includes provisions for selecting target operational performance ranges within which the control system will maintain cutterbar operation.

It is a further object of the present invention to provide a control system for an agricultural cutterbar that monitors cut uniformity across a swath width as an input for the control system and provides outputs for adjusting cutterbar speed and/or vehicle speed in response thereto.

It is a further object of the present invention to provide a control system for an agricultural cutterbar that monitors cutterbar input power and crop cut uniformity across a swath width as inputs for the control system and provides outputs for adjusting cutterbar speed and/or vehicle speed in response thereto.

It is a further object of the present invention to provide a control system for an agricultural cutterbar that manages cutterbar performance and efficiency by altering the approach angle of the cutterbar.

It is a still further object of the present invention to provide a control system for managing the operation of an agricultural cutterbar that monitors cutterbar input power and crop cut uniformity across a swath width and initiates signals which automate adjustments to cutterbar speed, cutterbar angle, and/or machine travel speed in order to optimize cutterbar input power and crop cutting uniformity.

It is a still further object of the present invention to provide an agricultural cutterbar monitoring system that is durable in construction, inexpensive of manufacture, carefree of maintenance, easily assembled, and simple and effective to use.

These and other objects are achieved in accordance with the instant invention by providing a control system for monitoring and managing operation of a rotary disc cutterbar used in an agricultural machine. A controller in the system receives inputs on cutterbar drive power, machine travel speed, and crop cut quality. An operator interface allows suitable operational tolerances to be established. The controller examines crop cut quality, a determination of cut uniformity across the transverse width of the cutting swath, and determines changes in cutterbar drive speed and/or vehicle travel speed, if needed, to maintain crop cut quality within specified tolerances. Controller output may be directed to a display for instructing a machine operator to make necessary adjustments or it may initiate changes in machine subsystems to effect the necessary adjustments automatically.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 is a partial side view of the header of FIG. 1 shown in a first operational position;

FIG. 3 is a partial side view of the header of FIG. 2 shown in a second operational position in which the cutterbar is angled;

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right" are used as a matter of mere convenience, and are determined by standing at the rear of the machine facing in its normal direction of travel. Likewise, "forward" and "rearward" are determined by the normal direction of travel. "Upward" and "downward" orientations are relative to the ground or operating surface as are any references to "horizontal" or "vertical" planes. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. When referring to the figures, like parts are numbered the same in all of the figures.

Figure 1:
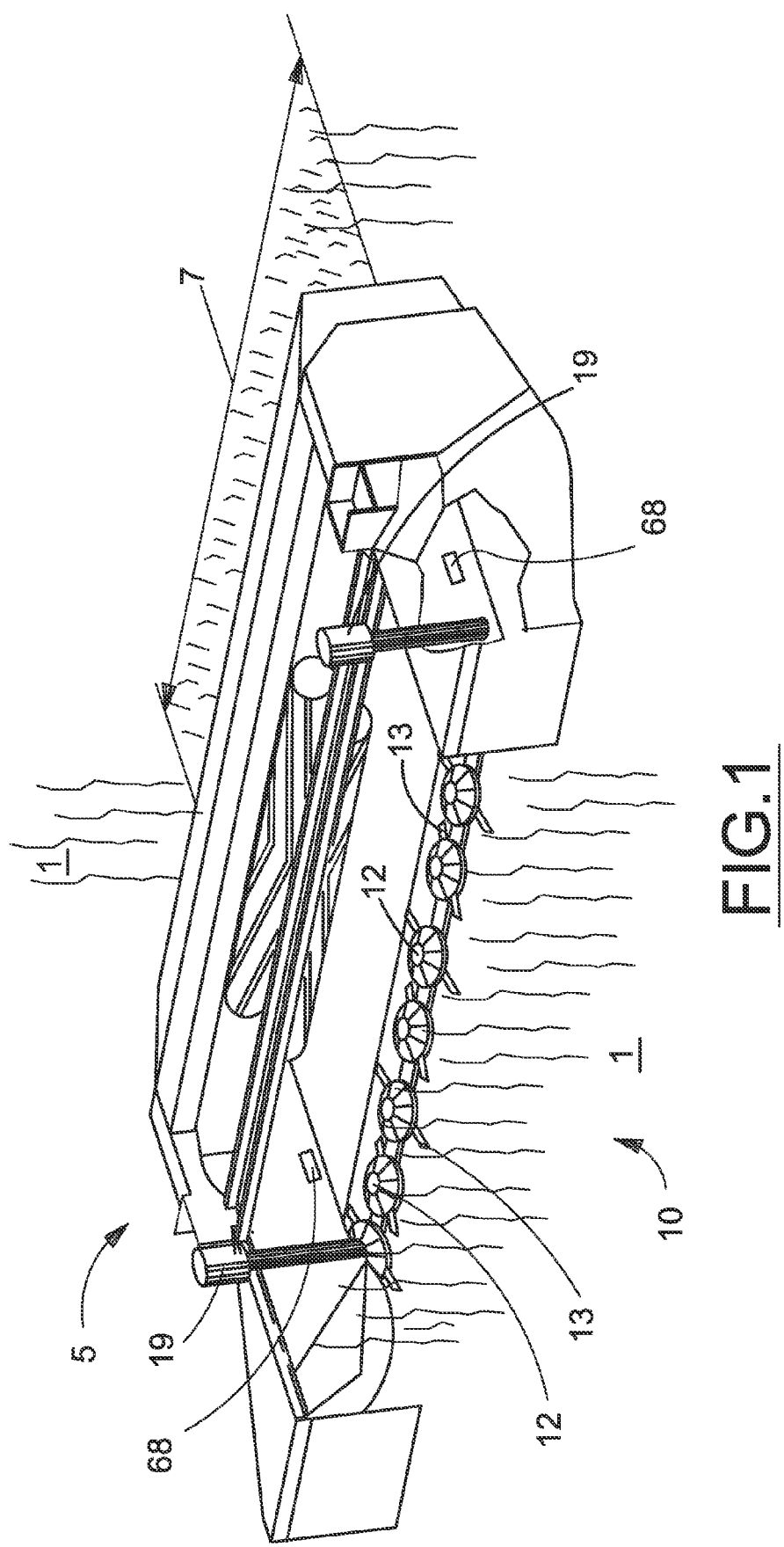
FIG. 1 is a partial perspective view of an agricultural header having a rotary disc cutterbar of the type on which the present invention is useful.

Referring now to the drawings and particularly to FIG. 1 where a header 5 having a rotary disc cutterbar 10 is presented. Rotary disc cutterbars of this type are commonly utilized in agricultural harvesting implements and a plurality of transversely spaced disc cutter modules 12, each configured for rotation about an upright axis. Each disc cutter module 12 has two or three knives 13 pivotally mounted on the periphery the module to sever standing crop 1 from the ground through an impact action creating a cut swath 7. For background information on the structure and operation of rotary disc cutterbars, reference is made to U.S. Pat. No. 4,815,262, issued to Koch et al. and to U.S. Pat. No. 5,996,323, issued to Campbell et al., the descriptive portions thereof being incorporated herein in full by reference.

Input power to the disc cutterbar 10 may be provided by drivers 19 connected to drive modules at one or both ends of the cutterbar. The cutterbar modules 12 are conventionally interconnected by a drivetrain that transfers power from the outboard modules laterally across the cutterbar so that all of the modules are rotated by the drivers 19. Drives 19 are commonly hydraulic motors. Alternatively, a mechanical drive connection to a power take-off on a tractor or an electrically powered motor can also be used to drive the cutterbar. An alternate electric motor driven rotary disc cutterbar in which individual disc cutterbar modules 12 are driven by an electric motor is disclosed in Applicant's currently pending application Ser. No. 13/332,213, the entirety of which is incorporated herein by reference. The present invention may be used with any cutterbar driver that is capable of variable speed operation. Additional benefits are possible in driver systems that include input power monitoring provisions.

Optimum cutting parameters vary depending upon the specific crop and numerous other conditions at the time of harvesting. Machine operators can typically vary the rotational speed of the cutterheads, the travel speed of the machine, and the cutting angle. Cutterhead and machine travel speed are typically easily adjustable by the machine operator. Cutting angle, the angular deflection from level of the plane of the cutterhead knives, is also generally adjusted from the machine operator console and is commonly varied by angling the entire header, illustrated in FIGS. 2 and 3. The cutterhead rotational pattern may also be altered to produce converging or diverging cutterhead pairs or rotation in unison (all cutterheads rotating the same direction). The relative effort necessary to alter cutterhead rotational patterns depends upon the cutterbar drive configuration and, in the case of mechanical drive cutterbars, may require a complete swap of the cutterbar.

Figure 4:
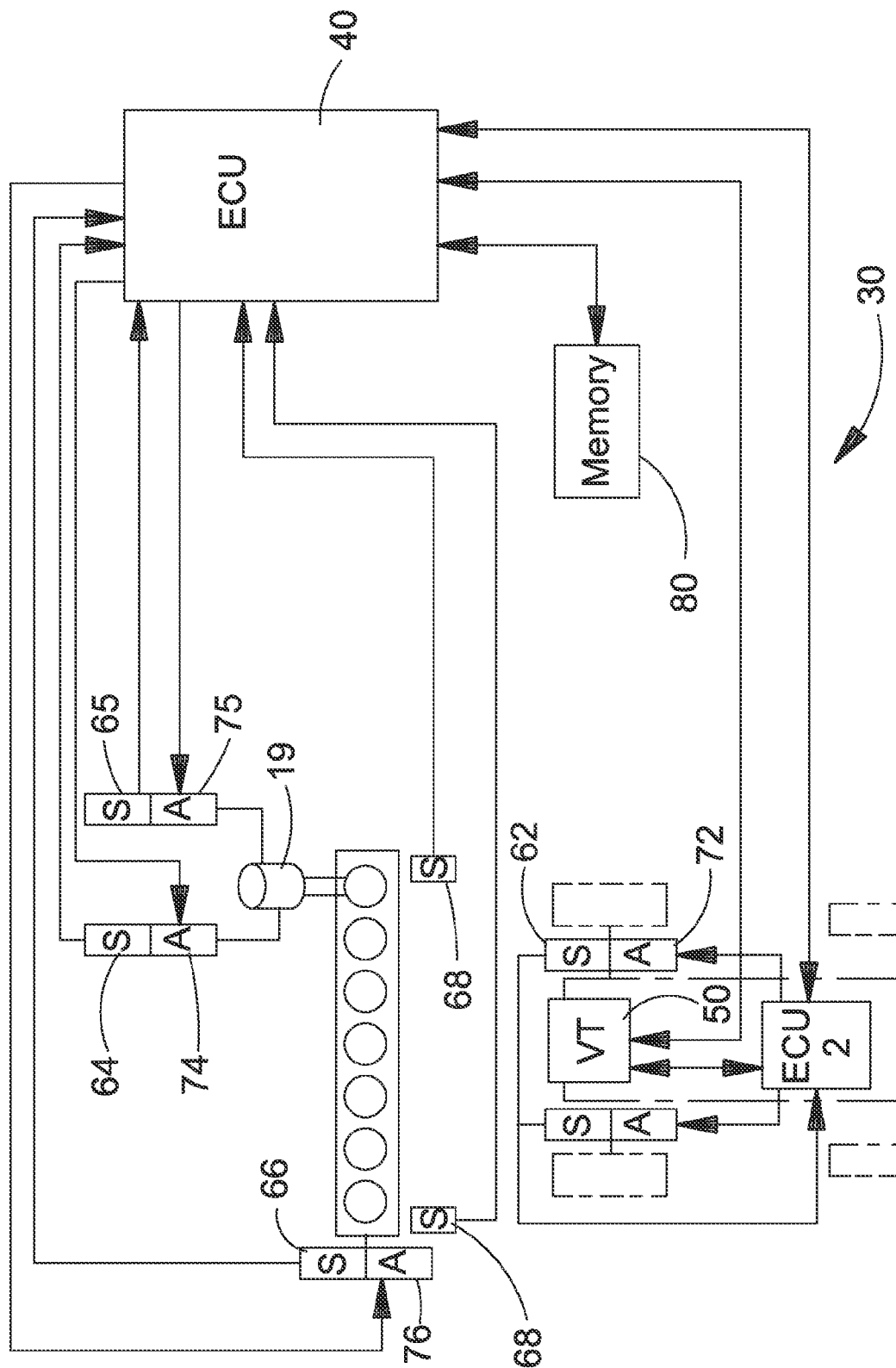
FIG. 4 is a diagram showing a first embodiment of a control system for an agricultural cutterbar incorporating the instant invention.

Referring to FIG. 4 in conjunction with FIGS. 1 through 3, a control system 30 for managing operation of the cutterbar 10 is shown comprising an electronic control module (ECU) 40, an operator interface module (virtual terminal) 50, input sensors for machine travel speed 62, cutterbar power 64, cutterbar speed 65, cutterbar angle 66, and crop cut quality 68, and output actuators to effect changes for a machine travel speed 72, cutterbar power 74, cutterbar speed 75, cutterbar angle 76, and an operator interface terminal, called a virtual terminal (VT) 50.

Most modern machines include an ISOBUS (ISO 11783) network infrastructure standard for transmitting data between various devices that may compose an agricultural machine. The ISOBUS physically comprises one or more Electronic Control Units (ECUs) and at least one Virtual Terminal (VT) which communicate among each other over the network. Communication is accomplished using the CAN protocol on a cabling for the transmission of electrical signals known as a bus. The CAN protocol is a standard field bus that is widely used in the automotive and agricultural equipment sectors. There may be multiple ECUs on a machine for managing several aspects of machine operation.

Each ECU is made up of the components in which resides the intelligence of the ISOBUS technology. Inside of each tractor and implement are many ECUs, each of which controls a particular subsystem, running specific software programs and interacting with specific hardware on the implement or tractor and communicating with other ECUs and the VT. Each ECU is connected to an array of sensors that relay input to the ECU and the ECU then reacts to the input by triggering necessary hardware components using the output terminals. Output responses are transmitted to actuator units, other ECUs, and the VT so the overall control system functions as a whole. While shown and described as a single ECU 40 in the figures, implementation of the control system 30 of the present invention may involve one or more ECUs. A single ECU 40 is described for convenience in the description.

The VT 50 allows the machine operator to interact with the various ECUs connected on the ISOBUS network and comprises a monitor for displaying information and one or more input devices. It primary purpose is to present information received from the ECU connected to the tool bus in a format useful to the machine operator and to receive machine operator input commands and transmit the commands to the ECU. The VT 50 typically does not perform processing, but transmits an input signal to an ECU for the ECU to act upon. The ECU updates the display values of the VT based on the input.

The ECU 40 is a programmable controller as described above. A first control algorithm receives a reading of power being supplied to the cutterbar via a signal from a power input sensor 64. A target range of power may be selected by the machine operator and input to the ECU 40 via the virtual terminal (VT) 50. During machine operation, the ECU 40 monitors cutterbar power and can detect overloading of the bar due to high crop or stone impact and direct an appropriate response such as slowing the machine via the machine speed output 72, increasing the rotating speed of the cutterbar, or a combination. The ECU 40 may also send a message to the VT 50 alerting the machine operator to take the required actions in configurations where automatic control of the parameter is not available.

In additional to cutterbar input power monitoring, the present control system 30 relies on one or more crop cut quality sensors 68 positioned laterally adjacent to the cut swath 7 and outboard and slightly rearward from the cutterbar 10 in an area beneath the cut crop flow from the cutterbar to further refine cutterbar management. The positioning of the cut quality sensors allows detection of variations in the height of the cut crop stubble aft of the cutterbar. Crop guides or similar shields 16 (shown in FIGS. 2 and 3) may be used to prevent cut crop from interfering with the sensing area of the cut quality sensors 68. Shields are essential in most embodiments to prevent interference from crop falling out of the main flow from the cutterbar and obstructing the view of the cut quality sensor across the swath.

In a preferred embodiment, the cut quality sensors 68 are optical sensors requiring a relatively unobstructed view across the entirety of the swath width. Multiple sensors 68 arranged with generally parallel views across the swath may also be used to provide better results (input signal based on an average of multiple sensors) to better determine a threshold of alarm for cut streaking. Alternatively, one or more sensors having a relatively wide field of view may be intermediately positioned along the cutterbar and arranged to view the entire transverse swath width from a mid-point position. Combinations of the aforementioned sensors are also contemplated for sensing diversity and improved cut quality performance. Non-contacting, non-optical sensors, such as ultrasonic, are also considered.

Signals from the cut quality sensors 68 are provided to the ECU 40. The ECU 40, upon detection in non-uniformity in the height of the cut crop stubble from the cut quality sensors 68, can adjust the rotational speed of the cutterbar (output to actuator 75), adjust the travel speed of the machine (output to actuator 72), adjust the cutterbar angle (output to actuator 76), or a combination thereof to minimize crop cut streaking (longitudinal streaks of uncut or poorly cut crop in the swath). As the ECU 40 is monitoring numerous other machine parameters, the algorithm can adjust the output without causing other monitored parameters to fall outside of desired operating ranges (e.g., cutterbar input power).

Figure 5:
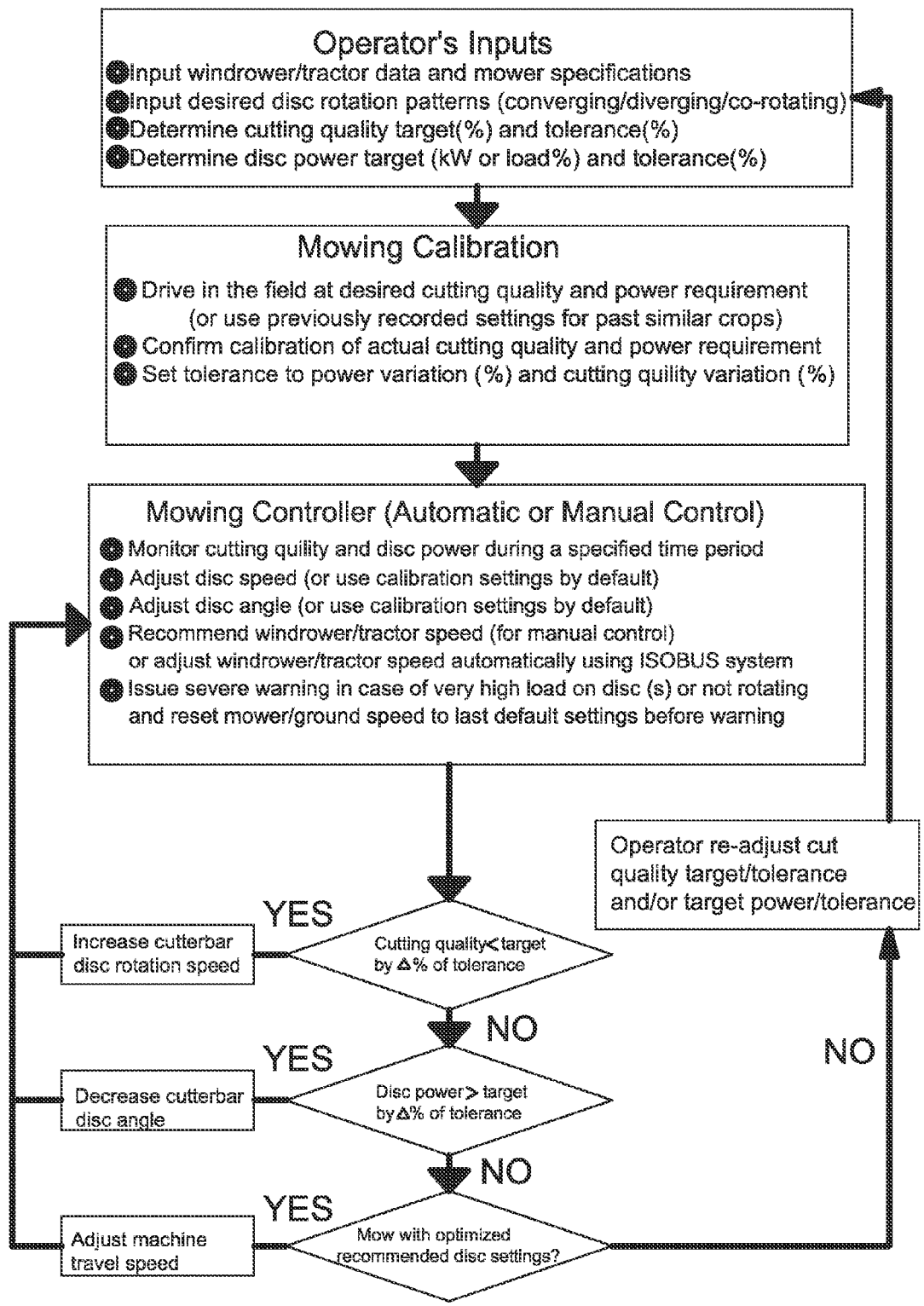
FIG. 5 is a flow chart of the set-up and calibration logic for the control system of the instant invention.

Machine operation using the cutterbar control system 30 involves input by the machine operator of several parameters and desired operating ranges, illustrated in FIG. 5. These input are preferably entered using the VT 50. The machine specification is entered to define the cutterbar arrangement (e.g., number of cutterheads, drive type, rotation pattern) and the tractor (e.g., rated PTO power, travel speed limits). In the case of some electrically driven cutterbars, selection of cutterhead rotational patterns may be variable and selectable by the machine operator for the crop cutting activity at hand (e.g., converging, diverging, or co-rotational).

Initial parameters and desired operating ranges are entered. The ECU is programmed to define selectable ranges (e.g., high, normal, low) on crop cut quality and cutterbar input power based on initial input values. The control system 30 may also be calibrated by operating the machine in a standing crop and comparing the actual values to the inputs using the selected tolerance ranges (Δ values). The results from the ECU are preferably communicated to the machine operator by the VT 50, recommending that the disc rotational speed, cutterbar angle, or machine travel speed be altered to achieve optimal results. Once calibrated, the operator will have an optimal cutterbar angle, cutterbar rotational speed, and machine travel speed for the specific crop being harvested. It may be necessary for the machine operator to refine some initial inputs in order to achieve optimal results.

The control system may also include a memory subsystem 80 allowing actual values from previous operations to be stored and used for subsequent input selections, eliminating the need for calibration. With the memory subsystem 80, it is possible to store performance results from previous operations for specific types to be used for subsequent settings and calibrations. The machine operator could simply initially input settings chosen from a previous cutting of the same crop.

The control system 30 is also capable of monitoring cutting performance after initial setup and calibration and to alert the operator of changing conditions. In the event of a cutterbar clog or jam, a very high cutterbar input power reading is received by the ECU 40 and an alert directed to the VT 50 so that necessary corrective actions can be taken. Similarly, a change in the crop cut quality as cutting operations progress in a field would be detected by the system and the machine operator alerted once the tolerance is exceeded.

Naturally, the invention is not limited to the foregoing embodiments, but it can also be modified in many ways without departing from the basic concepts. It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A control system for managing operation of a cutterbar on an agricultural machine, the cutterbar defining a swath having a width transverse to a direction of travel, said control system comprising:
   an operator terminal for receiving a machine user input and communicating an input signal representative thereof via a communications bus to a control module;
   the control module configured to determine at least one parameter operating range from the input signal;
   at least one cut quality sensor positioned rearwardly of the cutterbar and beneath crop discharge flow from the cutterbar for detecting variations in cut crop stubble cut by the cutterbar by scanning the cut crop stubble across the entire transverse cutting width of the swath and initiating a cut quality signal having a signal value representative thereof;
   wherein the control module is configured for receiving said cut quality signal and comparing a value of said cut quality signal to a cut quality range of said at least one parameter operating range, and transmitting a control output signal to an actuator, wherein said actuator is configured to cause a change in an operating parameter of at least one of the machine and cutterbar in response to said control output signal to bring said cut quality signal value within said cut quality range.

2. The control system of claim 1, further comprising a cutterbar power sensor for detecting drive power to the cutterbar, initiating a cutterbar power signal having a power signal value representative thereof and communicating said power signal to said control module, said control module receiving said power signal and comparing said power signal value and said cut quality signal value to a power signal range and a cut quality range that comprise said at least one parameter operating range, initiating said at least one control output signal and transmitting said at least one control output signal to said actuator to cause a change in machine operation to bring said cut quality signal value and said power signal value within respective said power signal and cut quality operating ranges.

3. The control system of claim 2, wherein said actuator includes a visual display on said operator terminal and said at least one control output signal directs the machine user to manually change machine operation to alter said at least one operating parameter.

4. The control system of claim 1, wherein said at least one operating parameter includes rotary disc rotational speed.

5. The control system of claim 1, wherein said at least one operating parameter includes machine travel speed.

6. The control system of claim 1, wherein the cutterbar is angularly adjustable about a transverse axis to the direction of travel and said at least one operating parameter includes cutterbar angle.

7. The control system of claim 2, wherein said actuator alters rotary disc rotational speed.

8. The control system of claim 2, wherein said actuator alters machine travel speed.

9. The control system of claim 8, wherein the cutterbar is angularly adjustable about a transverse axis to the direction of travel and said actuator alters said cutterbar angle.

10. The control system of claim 2, wherein said cut quality sensor is an optical sensor.

11. A method for managing operation of a rotary disc cutterbar on an agricultural crop harvesting machine comprising the steps of:
 entering a user input at an operator terminal connected to a communications bus, initiating by the operator terminal an operator input signal, and communicating the operator input signal via the communications bus to a control module;
 determining by the control module at least one parameter operating range based on the operator input signal, the at least one parameter operating range comprising a cut quality range;
 operating the cutterbar to harvest a standing crop and receiving by the control module a cut quality signal detected by at least one cut quality sensor positioned rearwardly of the cutterbar for detecting variations in cut crop stubble cut by the cutterbar crop cutting quality by scanning the cut crop stubble across the entire transverse cutting width of the swath and initiating a cut quality signal having a signal value representative thereof;
 comparing by the control module, the signal value of the cut quality signal to a cut quality range and determining at least one control output signal in response thereto to bring the cut quality signal value within the cut quality range; and
 transmitting said at least one control output signal to said actuator to cause a change in machine operation.

12. The method of claim 11, further comprising the steps of:
 providing a cutterbar power sensor for detecting drive power to the cutterbar,
 initiating a cutterbar power signal having a power signal value representative thereof and communicating said power signal to the control module and wherein the at least one parameter operating range further comprises a power signal range;
 comparing by the control module the power signal value to the power signal range;
 wherein determining by the control module the at least one control output signal calculated to bring the cut quality signal value within the cut quality range is in response to the power signal value and the cut quality signal value comparison to the cut quality range and the power signal range.

13. The method of claim 12, wherein the actuator includes a visual display on the operator terminal and the at least one output signal visually directs the machine user to manually change machine operation to alter the at least one operating parameter.

14. The method of claim 11, wherein the at least one operating parameter includes rotary disc rotational speed.

15. The method of claim 11, wherein the at least one operating parameter includes machine travel speed.

16. The method of claim 11, wherein the cutterbar is angularly adjustable about a transverse axis to the direction of travel and the at least one operating parameter includes cutterbar angle.

17. The method of claim 11, wherein the actuator, upon receiving the at least one output signal causes a change in the at least one operating parameter without machine user action.

18. The method of claim 17, wherein said at least one operating parameter includes rotary disc rotational speed, machine travel speed, or cutterbar angle.

19. A control system for managing operation of a header mounted directly to or pulled behind an agricultural machine, the header having a crop cutting mechanism comprising a plurality of connected knives and defining a swath having a width transverse to the direction of travel, said control system comprising:
 a control module connected to a communication network for receiving at least one input signal from said network, calculating a response to said input signal, and initiating a respective at least one output signal therefrom;
 at least one cut quality sensor positioned rearwardly of the cutting mechanism and beneath crop discharge flow from knives for detecting variations in cut crop stubble cut by the plurality of knives by scanning the cut crop stubble and initiating a cut quality signal having a signal value representative thereof; and
 the control module configured to receive said cut quality signal and compare said signal value to at least one cut quality input target and transmit at least one output signal to an actuator, wherein the actuator in response to the at least one output signal is configured to cause a change in at least one operating parameter of at least one the machine and header to adjust the cut quality signal toward the cut quality input target.

20. The control system of claim 19, wherein said at least one operating parameter includes a cutting speed of the plurality of knives, machine travel speed, or a cutting angle of the plurality of knives.

* * * * *